United States Patent [19]

Kim

[11] Patent Number: 5,353,122

[45] Date of Patent: Oct. 4, 1994

[54] PRINTING CONTROL APPARATUS COMPATIBLE WITH PRINTING SYSTEMS OF A LASER SCANNING UNIT TYPE AND A LIGHT EMITTING DIODE TYPE

[75] Inventor: Duk-Soo Kim, Kyungki, Rep. of Korea

[73] Assignee: SamSung Electronics Co., Ltd., Suwon, Rep. of Korea

[21] Appl. No.: 123,970

[22] Filed: Sep. 21, 1993

[30] Foreign Application Priority Data

Sep. 21, 1992 [KR] Rep. of Korea ............... 17159/1992

[51] Int. Cl.$^5$ ............................................. H04N 1/21
[52] U.S. Cl. ............................................. 358/296
[58] Field of Search .................. 346/107 R, 108, 160, 346/76 L, 1.1; 358/296, 298, 300, 302

[56] References Cited

U.S. PATENT DOCUMENTS

| | | |
|---|---|---|
| 4,691,237 | 9/1987 | Shinizu . |
| 4,800,442 | 1/1989 | Riseman et al. ................ 358/280 |
| 4,855,767 | 8/1989 | Sato . |
| 4,885,596 | 5/1989 | Egnea et al. . |
| 5,099,293 | 3/1992 | Kawai . |
| 5,107,278 | 4/1992 | Shimada et al. . |
| 5,134,512 | 7/1992 | Hiwada ............................ 359/196 |
| 5,140,675 | 8/1992 | Okada . |

*Primary Examiner*—Mark J. Reinhart
*Attorney, Agent, or Firm*—Robert E. Bushnell

[57] ABSTRACT

A printing control apparatus compatible with printing systems of a laser scanning unit type and a light emitting diode type contemplates a synchronizing signal supplying circuit which receives at least one signal out of a light emitting diode horizontal synchronizing signal generated when a period of a horizontal synchronizing signal of a light emitting diode type coincides with a given counting period and a beam detecting signal, and supplying a horizontal synchronizing signal corresponding to a printing system in response to a synchronizing select signal. A clock generating circuit generates a reference clock necessary for the generation of a plurality of signals and generates a video clock from the reference clock in response to the horizontal synchronizing signal and a latch driving signal from the reference clock. A latch signal generator generates a data latch signal having a given period from the reference clock in response to the latch driving signal. A strobe signal generator generates strobe signals to emit a light emitting diode array. A data output circuit generates video data to be printed according to a mode select signal. A control signal generator provides the synchronizing select signal to the synchronizing signal supplying circuit by latching an external control signal, provides the mode select signal to the data output circuit, and provides a laser diode control signal and a laser scanning unit motor control signal to the laser scanning unit.

3 Claims, 2 Drawing Sheets

PRINTING CONTROL APPARATUS COMPATIBLE WITH PRINTING SYSTEMS OF A LASER SCANNING UNIT TYPE AND A LIGHT EMITTING DIODE TYPE

CROSS-REFERENCE TO RELATED APPLICATIONS

This application makes references to, incorporates herein and claims all benefits arising under 35 U.S.C. §119 from my application entitled *Printing Control Apparatus Compatible With Printing Systems of A Laser Scanning Unit Type and Light Emitting Diode Type*, earlier filed in the Korea Industrial Property Office on 9 Sep. 1992 and duly assigned Serial No. 1992/17159.

BACKGROUND OF THE INVENTION

1. Field Of The Invention

The present invention relates to a printing system that records an object to be printed on a print medium such as paper by using light generated from a laser diode or a light emitting diode as an optical source, and more particularly, to a printing control apparatus which is compatible with a LSU (Laser Scanning Unit) type printing system and a LED (Light Emitting Diode) type printing system.

2. Background Of The Art

Generally, an electrophotographic technique is widely known as the xerography process and its basic principle uses the adsorption force of static electricity and an optical conductive semiconductor whose electric conductivity is varied by light. A printing system using such an electrophotographic technique may be constructed as either a laser scanning unit type or a light emitting diode type, according to the optical source device employed.

The printing system of the laser scanning unit type uses a laser light beam generated from a laser diode as the optical source, by supplying a control signal for controlling the laser diode to a laser scanning unit and uses information generated from a source such as a computer to print data. Meanwhile, the printing system of the light emitting diode type utilizes light generated from a light emitting diode as the optical source by supplying a strobe signal to a light emitting diode array.

Typically, printing control apparatuses used in the printing systems of the laser scanning unit type and the light emitting diode type have different configurations. The reason is that engine control signals that control the laser scanning unit positioned within an engine of the system do not coincide with those controlling the light emitting diode array. Recent efforts in the art however, have sought to use only one type of printing system while seeking a modicum of flexibility in printing. In *Printer Controller Apparatus Interfacing With External Data Sources* by Kunio Okada, U.S. Pat. No. 5,140,675, separate host and video interfaces are interposed between a printer interface and a laser beam printer in order to endeavor to accommodate printing of image information from both a host computer and another external controller. In the *Image Data Processing Apparatus Adaptable To Output Devices Of Different Types*, by Haruo Shimizu, described in U.S. Pat. No. 4,691,237 for example, when a laser scan optical unit type printer is connected to an image reader and image information is to be transmitted to that printer, a video signal is supplied to the printer in horizontal synchronization with the beam detect signal, and in other cases such as when inmage information is to be transmitted to a master unit such as an image file controller, the video signal is output in horizontal synchronization with a HSYNC signal generated by the reader. Yoshihisa Kawai in *Image Processing Apparatus Operable Analogue And Digital Copying Modes*, U.S. Pat. No. 5,099,293 suggests using a light emitting diode array head that can be switched to operated in either a digital copying mode and in an analogue copying mode. The apparatus disclosed by Shimizu '237 and Kawai '293 however, do not address the differences between printing systems. It has been my observation that if the printing control apparatus used in the printing system of the laser scanning unit type is compatible with that used in the printing system of the light emitting diode type, advantages can be expected, such as the reduction of cost by simplifying a manufacturing line, the simplicity of after-sale service and the convenience of use.

SUMMARY OF THE INVENTION

Accordingly, it is an object of the present invention to provide an improved printing control apparatus which overcomes the aforementioned deficiencies in the art.

It is another object to provide a printing control apparatus that is compatible with printing systems of a laser scanning unit type and a light emitting diode type printing systems.

It is still another object to provide a printing control apparatus that is applicable to printing systems of a laser scanning unit type and a light emitting diode type printing systems.

It is a yet further object to provide a printing controller that enables video image data to be printed on both laser scanning units and on light emitting diode printing units.

It is a still yet further object to provide a single integrated circuit chip having a printing controller regulating printing of video image data by both laser scanning unit and on light emitting diode unit printing systems.

It is a further object to provide a printing control apparatus that reduces manufacturing costs and has a compact configuration.

These and other objects may be achieved according to the principles of the present invention, with a printing control apparatus comprising a synchronizing signal supplying circuit that receives at least one signal out of a light emitting diode horizontal synchronizing signal generated when a period of a horizontal synchronizing signal of a light emitting diode type coincides with a given counting period and a beam detecting signal generated by a laser scanning unit, and supplies a horizontal synchronizing signal corresponding to a printing system in response to a synchronizing select signal. A clock generating circuit connected to the synchronizing signal supplying circuit, that determines the counting period, generates a reference clock necessary for the generation of a plurality of signals, and generating a video clock from the reference clock in response to the horizontal synchronizing signal and a latch driving signal from the reference clock in response to the synchronizing select signal. A latch signal generator connected to the clock generating circuit that generates a data latch signal having a given period from the reference clock in response to the latch driving signal. A strobe signal generator generates strobe signals for enabling emission from a light emitting diode array by shifting the reference clock in response to the data latch signal. A data output circuit generates video data to be printed according to a mode select signal. A control signal generator provides the synchronizing select signal to the synchronizing signal supplying circuit by latching an external control signal, provides the mode select signal to the data output circuit, and provides a laser diode control signal and a laser scanning unit motor control signal to the laser scanning unit.

Additionally, the printing control apparatus may include a test pattern data generator which provides test pattern data for testing a print state of the printing system to the data output circuit on the basis of the reference clock applied from the clock generating circuit.

Preferably, the synchronizing signal supplying circuit may be constructed with a horizontal synchronizing selector that receives a horizontal synchronizing signal of a light emitting diode type from the exterior. A counter receives the reference clock and generates a predetermined counting period, and a comparator compares a period of the horizontal synchronizing signal with the counting period and generates a light emitting diode horizontal synchronizing signal when they are the same. A selector generates any one of the light emitting diode horizontal synchronizing signal and a beam detecting signal in response to the synchronizing select signal.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1A:
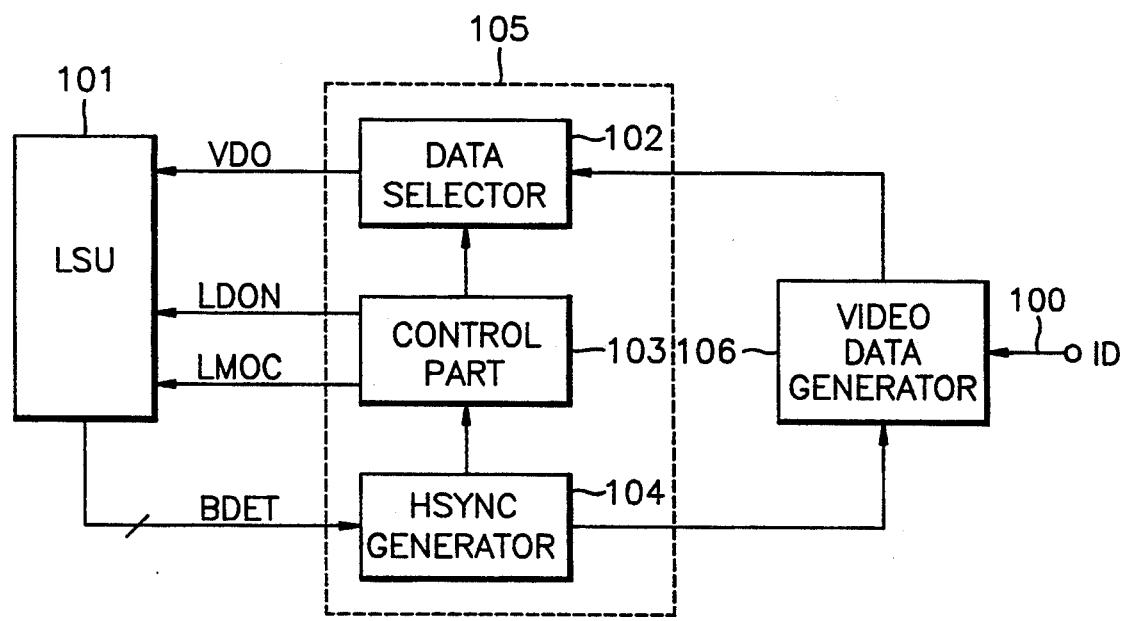
FIG. 1A is a block diagram showing a conventional printing control apparatus of a printing system of a laser scanning unit type.
Figure 1B:
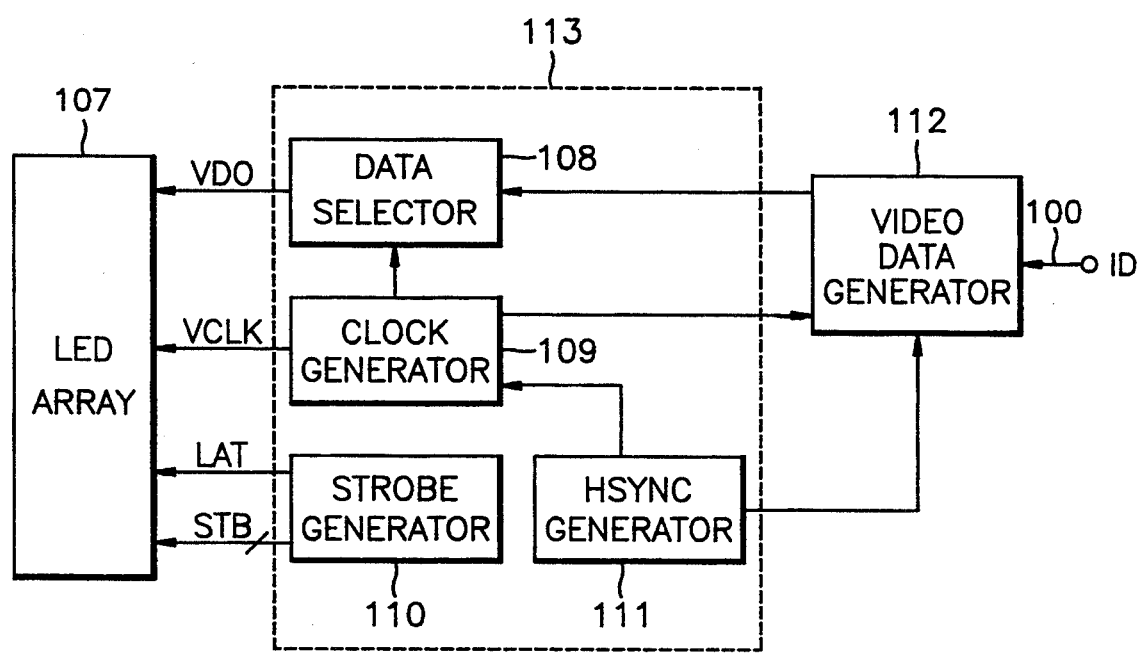
FIG. 1B is a block diagram showing a conventional printing control apparatus of a printing system of a light emitting diode type.

Turning now to the drawings, FIG. 1A shows a conventional printing control apparatus of the printing system of the laser scanning unit type, and FIG. 1B shows a prior printing control apparatus of the printing system of the light emitting diode type. The configuration and operation of the conventional printing control apparatus of the printing systems of the laser scanning unit type and the light emitting diode type are described with references to FIGS. 1A and 1B.

Referring to FIG. 1A, a laser scanning unit 101 prints video data VDO applied thereto in response to the laser diode control signal LDON and a laser scanning unit motor control signal LMOC and generates a beam detecting signal BDET used to generate a horizontal synchronizing signal. A printing control part 105 that drives the laser scanning unit 101 includes a data selector 102, a control part 103 and a horizontal synchronizing signal generator 104. A video data generator 106 receives image data applied through line 100 from a data processor to generate synchronized video data is connected between the horizontal synchronizing signal generator 104 and data selector 102.

The beam detecting signal BDET created by the generation of a laser beam of laser scanning unit 101 is applied to horizontal synchronizing signal generator 104. Signal generator 104 generates the horizontal synchronizing signal in response to the beam detecting signal BDET, and the horizontal synchronizing signal is applied to video data generator 106 and control part 103. The beam detecting signal BDET includes a ready signal and a horizontal signal necessary for the generation of the horizontal synchronizing signal. Video data generator 106 provides the synchronized video data to data selector 102 in response to the horizontal synchronizing signal. Data selector 102 selectively generates the synchronized video data to laser scanning unit 101 in response to a select signal applied from control part 103. Control part 103 provides the laser diode control signal LDON and the laser scanning unit motor control signal LMOC to laser scanning unit 101 in response to the horizontal synchronizing signal and the ready signal. Therefore, laser scanning unit 101 prints the selected video data on paper.

Referring to FIG. 1B, a conventional light emitting diode array 107 prints video data VDO applied thereto in response to the video clock VCLK, a latch signal LAT and a strobe signal STB. Printing control part 113 that drives light emitting diode array 107 has a data selector 108, a clock generator 109, a strobe signal generator 110 and a horizontal synchronizing signal generator 111. Video data generator 112 that receives video data applied through line 100 to generate synchronized video data is connected between horizontal synchronizing signal generator 111 and data selector 108.

Horizontal synchronizing signal generator 111 generates the horizontal synchronizing signal and this signal is applied to video data generator 112 and clock generator 109. The light emitting diode array 107 does not generate a signal such as the beam detecting signal shown in FIG. 1A. Clock generator 109 generates the video clock which coincides with the horizontal synchronizing signal and provides the video clock to video data generator 112, data selector 108 and light emitting diode array 107. Video data generator 112 provides the synchronized video data to data selector 108 in response to the video clock and the horizontal synchronizing signal. Data selector 108 selectively provides the video data to light emitting diode array 107 in response to the video clock provided as the select signal. Strobe signal generator 110 applies the latch signal to latches the video data and the strobe signal to emit the light emitting diode to light emitting diode array 107. Hence light emitting diode army 107 prints the video data on paper by emitting the light emitting diode corresponding to the strobe signal when the selected video signal is latched to its array.

It will be appreciated that printing control part 105 which drives laser scanning unit 101 and printing control part 113 which drives light emitting diode array 107 have different configurations and operations. Therefore printing control part 105 can not be used to drive light emitting diode array 107. Similarly, printing control part 113 can not be used drive light scanning unit 101. That is, the printing control parts for the printing systems of the laser scanning unit type and light emitting diode type are separately manufactured. As a result, since separate manufacturing and assembly lines should be installed, it is difficult to reduce the manufacturing cost. Furthermore there is the complexity of after-sale service, and inconvenience of use.

An exemplary printing control apparatus of a printing system embodying the present invention is described. In the following description, numerous specific details are set forth to provide a more thorough understanding of the present invention. It will be apparent, however, to one skilled in the art, that the present invention may be practiced without these specific details. In other instances, well known circuits have not been described so as to not obscure the principles of present invention. In the explanation of the drawings, like reference numerals and symbols are used to designate like elements.

Figure 2:
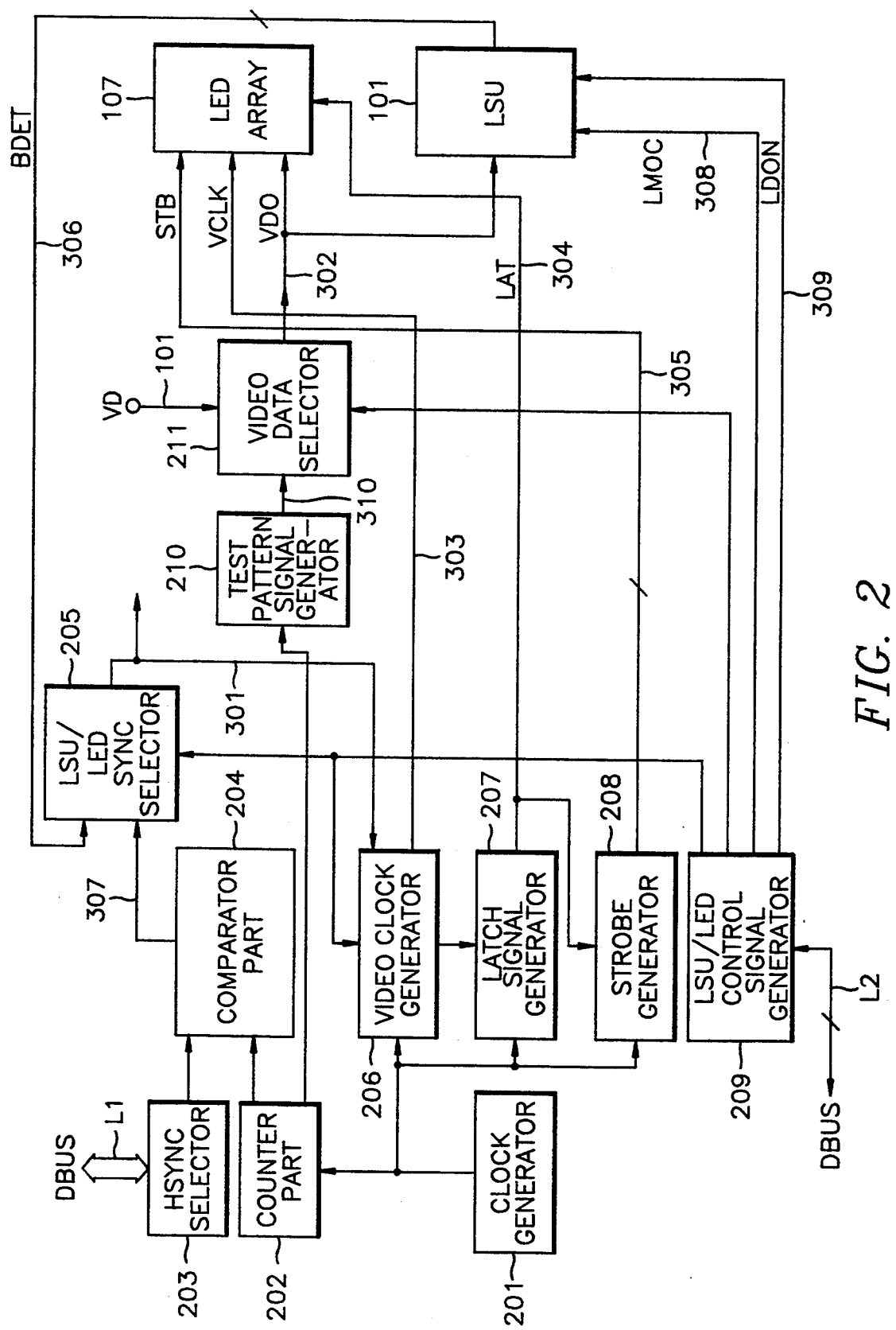
FIG. 2 is a block diagram of a printing control apparatus constructed according to the principles of the present invention to provide compatibility with laser scanning unit type and light emitting diode type printing systems.

Referring now to FIG. 2, a horizontal synchronizing selector 203 selects a period of a horizontal synchronizing signal for a light emitting diode type printing system received through a data bus line L1 from the exterior, and provides the received period of the horizontal synchronizing signal to a comparator 204, Counter 202 with a fourteen bit counting device receives a reference clock from clock generator 201 and, on the basis of that reference clock, provides a predetermined counting period signal to horizontal synchronizing selector 203 and to test pattern signal generator 210. In response to the counting period signal from counter 202 and the horizontal synchronizing signal from selector 203, comparator part 204 provides a light emitting diode horizontal synchronizing signal to selector 205 through line 307 when the periods of the horizontal synchronizing signal and the counting period signal coincide with each other.

By way of explanation of a second aspect of the circuit illustrated in FIG. 2, assume that the printing system has a light emitting diode type unit using a light emitting diode array 107, a LSU/LED synchronizing selector 205 selectively generates the light emitting horizontal synchronizing signal applied through line 307. That is, in the printing system without any laser scanning unit 101, no beam detecting signal BDET is generated on line 306. A controller 410 for the system supplies command data for controlling an engine of the light emitting diode type through a data bus line L2 as a control signal. Therefore, LSU/LED control signal generator 209 provides a synchronizing select signal to LSU/LED synchronizing selector 205 by latching the control signal from controller 410 and provides a mode select signal to video data selector 211. In this instance, the command data from controller 410 prevents generator 209 from generating laser diode control signal LDON and laser scanning unit motor control signal LMOC. A video clock generator 206 coupled to receive the reference clock from clock generator 201, generates a video clock on the basis of the reference clock received, in response to the horizontal synchronizing signal, and applies the video clock through line 303 to light emitting diode array 107. Thereafter video clock generator 206 generates a latch driving signal from the reference clock in response to the synchronizing select signal and supplies the latch driving signal to latch signal generator 207. Latch signal generator 207 is connected to clock generator 201, and generates a data latch signal LAT having a given period derived from the reference clock in response to the latch driving signal, and provides the data latch signal LAT through line 304 to light emitting diode array 107. By shifting the reference clock in response to the data latch signal LAT, strobe signal generator 208 generates strobe signals STB for enabling light emitting diode array 107 to emit energy in the form of light, by shifting the reference clock in response to the data latch signal LAT, and provides strobe signals to the light emitting diode array 107 through line 305. Image data provided by a data processor such as a computer, is converted into video data by a video controller (not shown) and applied through line 120 to video data selector 211. The video data for a light emitting diode type printing system is data synchronized by the light emitting diode horizontal synchronizing signal on line 301 through the video clock provided by generator 206 to array 107. Video data selector 211 produces video data VDO to be printed according to the mode select signal provided by generator 209. Therefore, upon receiving the strobe signal STB provided by strobe generator 208, video clock VCLK provided by video clock generator 206, video data VDO provided by selector 211, and data latch signal LAT provided by latch signal generator 207, light emitting diode array 107 begins printing images represented by video data VDO. Alternatively, and as is explained in greater detail below, test data can be generated by using the mode select signal from control signal generator 209 to select test pattern signal generator 210.

Assume now, in order to accommodate an explanation of a third aspect of the circuit illustrated in FIG. 2, that the printing system is a laser scanning unit type using a laser scanning unit 101 (as distinguished from the printing system using light emitting diode array 107 explained earlier), LSU/LED control signal generator 209 corresponds to corresponding control data from controller 410 by laser scanning unit motor control signal LMOC and supplying laser diode control signal LDON through lines 308 and 309, respectively, to laser scanning unit 101. In this example, beam detecting signal BDET is provided by the laser scanning unit 101 via line 306. LSU/LED synchronizing selector 205 now provides the horizontal synchronizing signal for the laser scanning unit type through line 301 to video clock generator 206. This laser scanning unit type horizontal synchronizing signal is applied to video controller (not shown), and the video data corresponding to the laser scanning unit type printing system is fed to video data selector 211 via line 120. Hence after receiving video data VDO provided by selector 211, motor control signal LMOC and laser diode control signal LDON provided by control signal generator 209, laser scanning unit 101 begins printing images represented by video data VDO.

As explained in the description of the light emitting diode type printing unit, test data can be generated by selecting the test pattern signal generator 210. In order to test the performance of the engine of the printing system, test pattern signal generator 210 provides test pattern data for testing a print state of the printing system through a line 310 to the video data selector 211 on the basis of the reference clock applied from the counter 202. In this case, the mode select signal is a signal for generating data provided on line 310 to video data selector 211.

All the elements shown in FIG. 2 may be constructed upon a single LSI chip, so as to provide a compact configuration. Furthermore, the manufacturing costs can be reduced by sharing the printing control apparatus of a printing systems between light emitting diode type and laser scanning unit type printing systems in a single manufacturing line.

While preferred embodiment of the invention are shown and described, it will be understood by those skilled in the art that foregoing and other changes in form and details may be made without departing from the spirit and scope of the present invention as defined by appended claims.

What is claimed is:

1. A printing control apparatus of an electrophotographic printing system, comprising:

synchronizing signal supplying means for receiving at least one signal out of a light emitting diode horizontal synchronizing signal generated when a period of a horizontal synchronizing signal of a light emitting diode type printing system coincides with a given counting period and a beam detecting signal generated by a laser scanning unit, and supplying a horizontal synchronizing signal corresponding to a printing system in response to a synchronizing select signal;

clock generating means connected to said synchronizing signal supplying means, for determining said counting period, generating a reference clock for the generation of a plurality of signals, for generating a video clock from said reference clock in response to said horizontal synchronizing signal and for generating a latch driving signal from said reference clock in response to said synchronizing select signal;

latch signal generating means connected to said clock generating means, for generating a data latch signal having a given period form said reference clock in response to said latch driving signal;

strobe signal generating means for generating strobe signals for enabling emission of energy from a light emitting diode array by shifting said reference clock in response to said data latch signal;

data output means for generating video data to be printed according to a mode select signal; and control signal generating means for providing said synchronizing select signal to said synchronizing signal supplying means by latching an external control signal, providing said mode select signal to said data output means, and providing a laser diode signal and a laser scanning unit motor control signal to a laser scanning unit of a laser scanning type printing system.

2. The printing control apparatus as claimed in claim 1, further comprising:

test pattern data generating means for providing test pattern data for testing a print state of the printing system through said data output means on the basis of said reference clock applied form said clock generating means.

3. The printing control apparatus as claimed in claim 1, further comprises of said synchronizing signal supplying means comprising:

a horizontal synchronizing selector for receiving a horizontal synchronizing signal of a light emitting diode type printing system from the exterior;

a counter generating a predetermined counting period in dependence upon said reference clock;

a comparator generating a light emitting diode horizontal synchronizing signal in dependence upon a comparison of a period of said horizontal synchronizing signal with said counting period; and a selector generating a horizontal synchronizing signal corresponding to a printing system in response to said synchronizing select signal, on a basis of any one of said light emitting diode horizontal synchronizing signal and a beam detecting signal.

* * * * *

UNITED STATES PATENT AND TRADEMARK OFFICE
CERTIFICATE OF CORRECTION

PATENT NO. : 5,353,122
DATED : 10/4/94
INVENTOR(S) : Duk-Soo KIM

It is certified that error appears in the above-indentified patent and that said Letters Patent is hereby corrected as shown below:

Column 4     Line 55,     After "diode" change "army" to -- array --;

Line 65,     Before "drive" insert -- to --:

IN THE CLAIMS

Column 8     Line 18,     After "applied" change "form" to -- from --:

Signed and Sealed this

Twentieth Day of June, 1995

Attest:

BRUCE LEHMAN

Attesting Officer      Commissioner of Patents and Trademarks